3 Sheets—Sheet 1.
W. WARREN.
STREET-SWEEPING MACHINE.
No. 172,215. Patented Jan. 11, 1876.
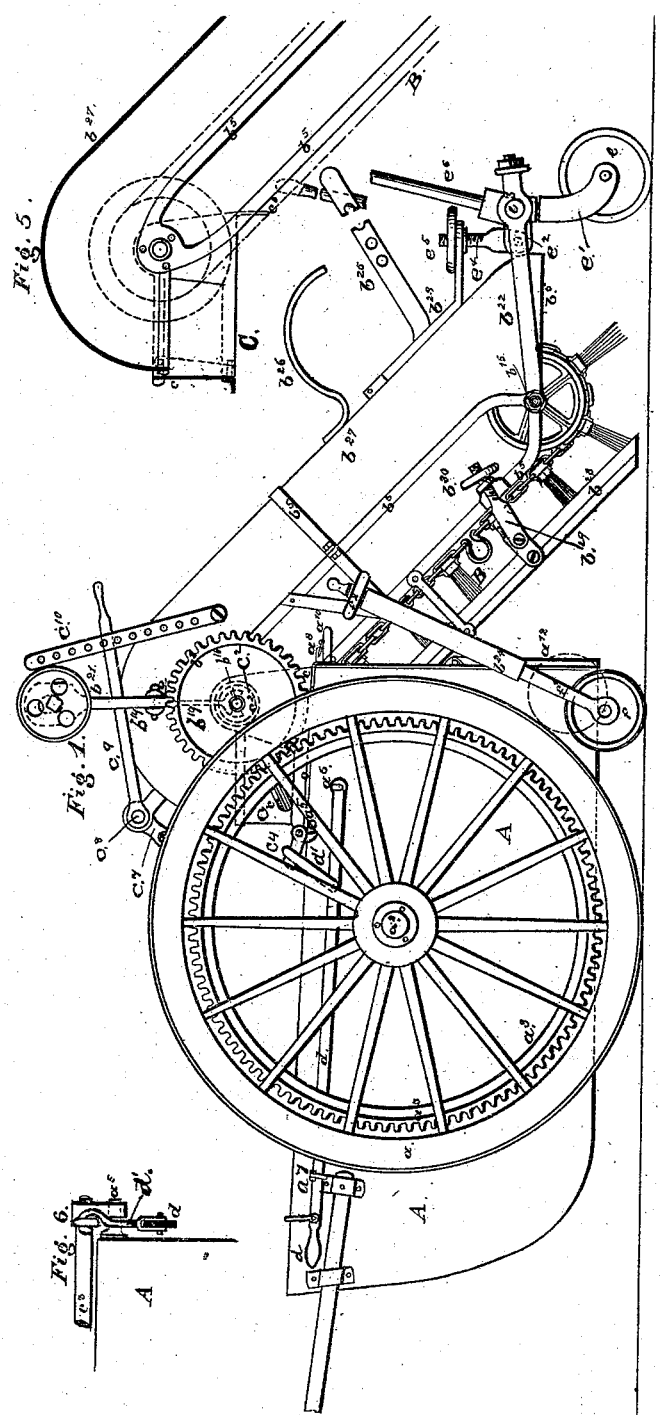
Witnesses.
Chs. H. Ladd
Wm. H. Seymour
Inventor:
William Warren
by Z. S. Durfee atty.

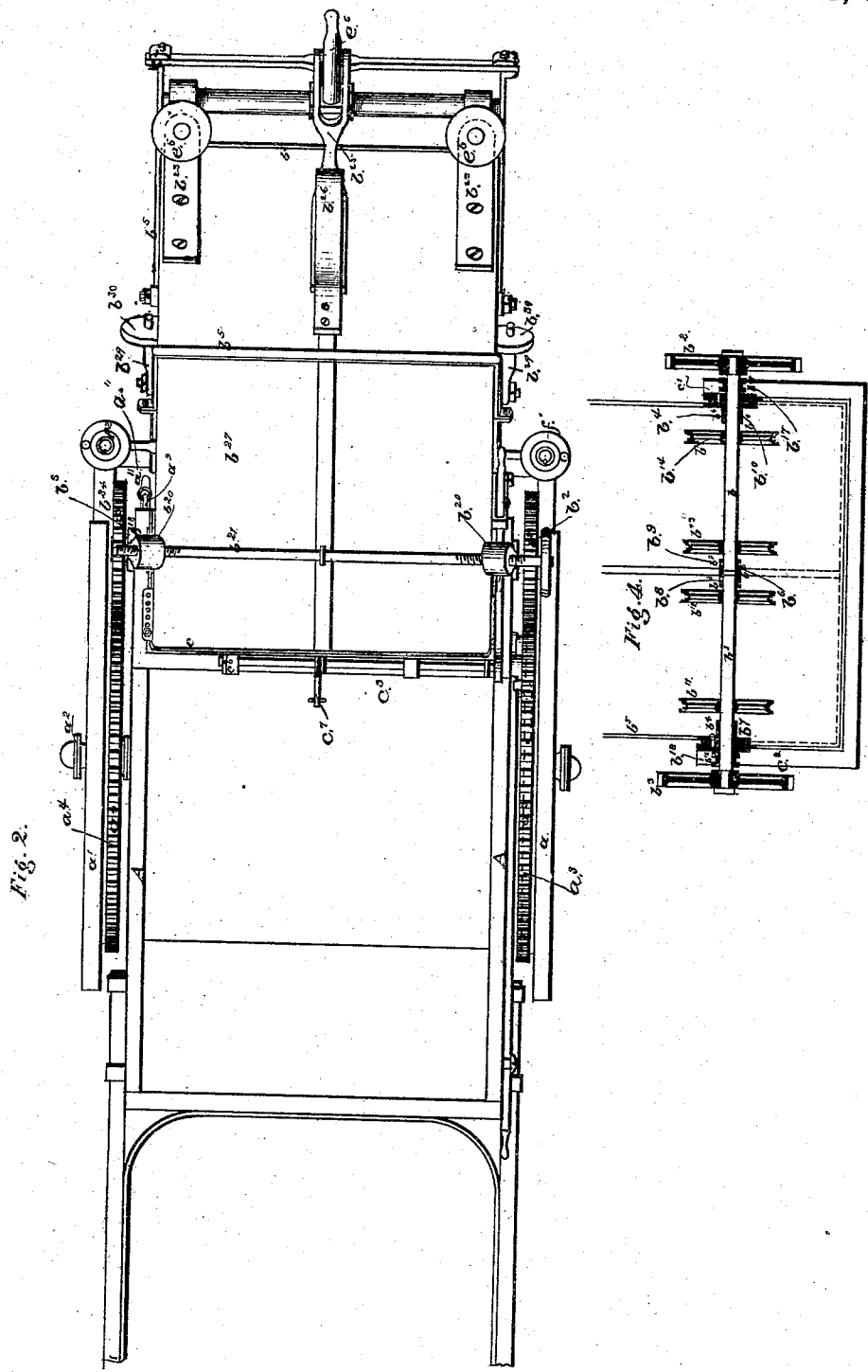

W. WARREN.
STREET-SWEEPING MACHINE.
No. 172,215. Patented Jan. 11, 1876.
3 Sheets—Sheet 3.
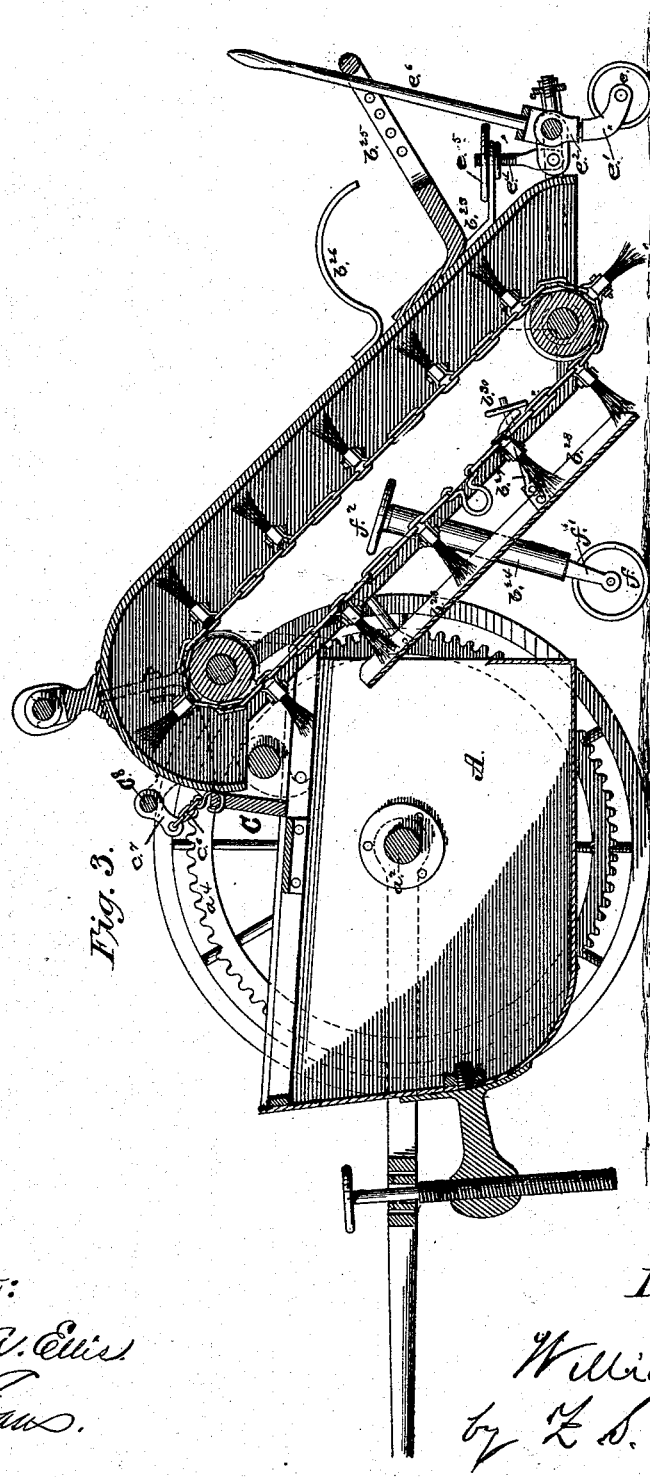
Attest:
John A. Ellis
W. M. Evans
Inventor:
William Warren
by Z. S. Durfee atty

UNITED STATES PATENT OFFICE.

WILLIAM WARREN, OF CHELTENHAM, ENGLAND, ASSIGNOR TO HIMSELF AND ZOHETH S. DURFEE, OF NEW YORK, N. Y.

IMPROVEMENT IN STREET-SWEEPING MACHINES.

Specification forming part of Letters Patent No. 172,215, dated January 11, 1876; application filed June 19, 1873.

*To all whom it may concern:*

Be it known that I, WILLIAM WARREN, of Cheltenham, in the county of Gloucester, England, have invented a Machine for Sweeping and Cleaning Streets, of which the following is a specification:

Figure 1 of the drawing hereto annexed shows a side elevation; Fig. 2, a plan of part of a machine for street sweeping and cleaning, constructed and arranged according to my improvement. Fig. 3 shows a longitudinal vertical section of the machine; Fig. 4, a transverse vertical section, and Fig. 5 a longitudinal vertical section; and Fig. 6, a perspective view or elevation of some of the details of the machine.

A is the cart or receptacle for the matters raised from the surface of the street by the endless chain of brushes B. The cart is supported by, and travels upon, the wheels $a$ $a^1$. Moving upon the axle $a^2$ $a^3$ $a^4$ are toothed wheels or rings, secured to the traveling wheels $a$ $a^1$, and revolving with them, and the toothed wheels $a^3$ and $a^4$ take into and (when the cart is traveling along) drive the toothed pinions $b^2$ $b^3$ at either end of the axes $b$ $b^1$, which drive the endless chains of brushes B. The axes $b$ $b^1$ revolve in bearings $b^4$, formed in the framing $b^5$ of the sweeping-machine, and the axes $b$ $b^1$ also revolve in a bearing, $b^6$, which is secured to the frame-work of the sweeping-machine, and acts to support the inner ends of the axes $b$ $b^1$. $b^7$ $b^8$ $b^9$ $b^{10}$ are collars upon the axes $b$ $b^1$, which serve to prevent such axes from moving endwise; and $b^{11}$ $b^{12}$ $b^{13}$ $b^{14}$ are chain-pulleys, around which the traveling chains pass, carrying the sweeping-brushes, and by means of which they are driven. The endless chain of traveling brushes B also passes around pulleys upon the axes $b^{15}$ $b^{16}$, which are similar to the axes $b$ $b^1$, in the manner in which they are supported and arranged to work independently of one another.

It will be readily understood that two separate and independent chains of brushes are arranged to work in this machine, the one chain of brushes being driven from the right-hand traveling wheel, and the other from the left-hand traveling wheel of the cart.

The pinions $b^2$ $b^3$ are so arranged that the axes $b$ $b^1$ can either revolve or remain stationary while the cart is in motion, and this is effected by means of the clutches $b^{17}$ $b^{18}$, sliding upon a feather upon the axes $b$ $b^1$. The pinions $b^2$ $b^3$ are loose upon the axes $b$ $b^1$, and only communicate motion to the axes $b$ $b^1$ when the teeth of the clutches $b^{17}$ $b^{18}$ are engaged with clutch-teeth formed upon the bosses of the pinions $b^2$ $b^3$. The engagement and disengagement of the pinions $b^2$ $b^3$ with the clutches $b^{17}$ $b^{18}$ is effected by means of forked levers $b^{19}$ on either side of the machine, one of which is seen at Fig. 1, the upper end of the forked levers having swiveling nuts $b^{20}$ in them, so arranged that, by means of the shaft $b^{21}$, having threads on both its ends passing through said nuts, and a band-wheel on one or both of its ends, the nuts can be moved to and fro on the shaft, and the levers $b^{19}$ operated so as to throw the clutches $b^{17}$ $b^{18}$ in and out of gear, and thus determine the running of the pinions $b^2$ $b^3$, and of the corresponding sets of brushes.

When it is desired to arrange so as to work one set of brushes without working the other, the shaft $b^{21}$ will be divided in the middle, the inner end of each half working in separate journals, similar to that now used for both, and each half arranged to turn without actuating the other.

Another part of my invention consists in an improved mode of arranging and constructing street sweeping and cleaning machinery, so that the sweeping or cleaning apparatus may be readily detached from the cart when full, and attached to an empty cart, so as to avoid the necessity of carrying the sweeping or cleaning apparatus with the filled cart to be discharged. For this purpose the sweeping and cleaning apparatus is so arranged, in combination with the cart, that the fastenings which connect the two parts of the machine together can be readily removed, in order to detach the apparatus from the cart when filled, the sweeping apparatus being retained in a suitable position by arms or supports, and wheels carried thereby, until again attached to an empty cart.

By this arrangement each sweeping and cleaning apparatus will serve to fill a number of carts, and may thus be kept in constant use, while the filled carts go away to discharge their contents.

I will now describe the arrangements for carrying this part of my invention into practice, reference being had to the accompanying drawing. $c$ is a jaw or frame-work, by means of which the sweeping-machine is connected to the cart, and the jaw $c$ is connected to the frame-work $b^5$ of the sweeping-machine by means of the circular collars or joints $c^1$ $c^2$, which are concentric with the axes $b$ $b^1$, and so arranged that the jaw $c$ can move around these axes; and, consequently, when the jaw $c$ is secured to the cart, the chains of brushes B and the parts connected with them can accommodate themselves to the surface of the road over which the machine may be traveling. This jaw $c$ is moved on the axes $b$ $b^1$ as follows: A chain, $c^6$, attached to its front plate, is fastened to the end of a lever, $c^7$, fixed on the shaft $c^8$, which works with a partial revolution in bearings on the top of the sweeping-machine. It is turned by a lever, $c^9$, which works in the slot of the rack $c^{10}$, which is provided with pin-holes for the insertion of pins to regulate the position of the lever $c^9$, and as the lever $c^9$ is raised or lowered it turns the axis $c^8$, and, moving the lever and chain fixed on that axis and attached to the jaw $c$, it moves the jaw correspondingly. $c^3$ is an axis supported in bearings attached to the jaw $c$, and upon the axis are fastened the catch-levers $c^4$ $c^4$, which hook over studs $a^5$ $a^5$ on the cart A, and are held in place by a link or hook, $d'$, attached to the lever $d$. This lever $d$ is held fixed when the apparatus is connected by the stud $a^7$, attached to the cart A.

When it is desired to detach the sweeping-machine from the cart the lever $d$ is released from the catch $a^7$, and the link or hook $d'$ from the catch-lever $c^4$, which lever then releases its hold on the stud $a^5$. The lever $c^9$ is then operated so as to lift the jaw $c$, and the keys or cotters $a^8$ $a^9$ being removed from the studs $a^{10}$ $a^{11}$, the jaw $c$ and the apparatus B, with the chains of brushes, can then be removed, and by a reversal of this procedure the sweeping-machine can then be attached to another cart.

While the sweeping-machine is attached to a cart it is supported at its outer end by the trail-wheel $e$ and around the axes $b$ $b^1$; but when the machine is withdrawn from the cart it is supported in a suitable position for being reattached by means of wheels $f$ $f$ on either side of the machine. These wheels $f$ revolve in bearings made in the forked ends of the legs $f^1$ $f^1$, which are supported by the sockets $b^{24}$ attached to the frame-work $b^5$ of the machine, and the legs have screws on their upper ends, which fit into corresponding nuts constructed in the hubs of the hand-wheels $f^2$ $f^2$, which work on the ends of the sockets $b^{24}$, by turning which the legs $f^1$ $f^1$ and wheels $f$ $f$ can be raised after the machine is attached to a cart, and be lowered when it is removed.

The trail-wheel $e$ revolves in the forks of a bracket, $e^1$, which is attached by a swivel-joint to another bracket, $e^2$, fastened on the shaft $e^3$, which has its bearings in arms $b^{22}$, projecting from and fastened to the frame $b^5$ of the machine. At each end of the shaft $e^3$, inside its supporting-arms, is attached a lever with a forked end, in which fork is bolted loosely a screw, $e^4$, which passes up through a bracket, $b^{23}$, fastened to the cover of the machine $b^{27}$ into a nut or female screw in the hand-wheel $e^5$. This hand-wheel has a collar on it, which works under the bracket $b^{23}$, so that as the wheel is turned up and down on the screw $e^4$ the bracket goes with it, carrying the end of the machine, to which it is fastened.

On the shaft $e^3$ is fastened a lever, $e^6$, which extends up between the arms of a bracket, $b^{25}$, attached to the top of the machine. This bracket has in both its arms opposite to each other several holes, through which pins are inserted to control the position of the lever $e^6$, and a spring, $b^{26}$, is attached to the top of the machine opposite to the lever $e^6$, so as to prevent its coming too far forward, while permitting a considerable elasticity of motion in case the machine meets obstructions. These details last described enable the man in charge of the machine to regulate from time to time the position of the brushes, and the mode of doing it is as follows:

When the lever $e^6$ is fixed in a position bearing against the spring $b^{26}$, it holds the shaft $e^3$, its two attached levers and the screws $e^4$, and the brackets $b^{23}$ in a definite position, and consequently the lower end of the machine and the chains of brushes have a certain relation to the surface to be swept. Then, by means of the hand-wheels $e^5$ $e^5$, working on the screws $e^4$, the machine and brushes can be raised at its lower end or lowered to any extent desired to make the brushes work well, and the machine is ready for work. But whenever there is need to relieve the brushes from obstructions, or to stop them from raising the dirt temporarily, without stopping the cart, by pulling the lever $e^6$, which turns the shaft $e^3$ and raises the levers and the screws $e^4$, the whole lower end of the machine, with the brushes, can be raised clear of the obstacle, and the entire apparatus can move on without doing any work.

$b^{28}$ represents an inclined table, up which the dirt swept by the brushes is carried by them into the cart A. This table is fastened at its upper end by loose joints to the frame $b^5$ of the machine, and is held and regulated in position below by the bars $b^{29}$, attached to it by loose joints, these bars having on their upper ends screws, which pass through brackets on the frame $b^5$ of the machine into hand-wheels $b^{30}$, provided with nuts at their hubs, in which the screws $b^{29}$ work, and by the turning of which wheels the inclination of the table and its nearness to the ground may be varied at will.

Having thus described the nature of my invention, and the details of the apparatus I employ to carry it into effect, what I claim is—

1. The combination, in a sweeping-machine, of the two independent sets of chain-brushes, working on the driven shafts $b$ and $b^1$, and corresponding leading-shafts $b^{15}$ and $b^{16}$, with the movable inclined table $b^{28}$, attached at its upper end by jointed connecting-bars to the frame-work $b^5$ of the machine, and at its lower end by the screws $b^{29}$ on each side of the table, which run through brackets on the frame of the machine and into nuts in the hand-wheels $b^{30}$, by turning which the position of the table with reference to the brushes is determined, as described and shown in the foregoing specification and accompanying drawings.

2. The combination, in a sweeping-machine, of the clutches $b^{17}$ $b^{18}$ on the shafts $b$ $b^1$ with the pinions $b^2$ $b^3$, the forked levers $b^{19}$, having swiveling nuts $b^{20}$ on their upper ends, the shafts $b^{21}$, having screws on each end, working into said nuts, and hand-wheels for working the screws, the same being so combined for throwing the chains of brushes in the machine in and out of motion, as fully described and shown in the accompanying specification and drawings.

3. The jaw $c$, working on its joints $c^2$ on the shafts $b$ $b^1$, in combination with the chain $c^6$, lever $c^7$ on the shaft $c^8$, and the lever $c^9$ and catch-lever $c^4$, all constructed and arranged to effect the connection of the machine with the cart A, as more fully set out in the accompanying specification and drawings.

4. The lever $d$, link or hook $d^1$, and catch $a^7$ on the cart A, in combination with the catch-levers $c^4$ on the jaw $c$, substantially as and for the purpose described.

5. The combination, in the machine described, of the wheel $e$, with the swiveling bracket $e^1$, working on the fixed bracket $e^2$ on the shaft $e^3$, the screws $e^4$, fastened loosely on arms on the shaft $e^3$, the hand-wheel $e^5$, working on the screws $e^4$, the brackets $b^{23}$, lever $e^6$, rack $b^{25}$, and spring $b^{26}$, constructed and combined to work together, for the regulation and control of the movements and position of the chains of brushes, as described and shown in the accompanying specification and drawings.

6. The combination, in the machine described, of the wheels $f$, running in the forked legs $f^1$, which legs are movable to and fro in the sockets $b^{24}$ by the hand-wheels $F^2$, carrying nuts working on screws on the ends of the legs $f^1$, substantially as and for the purposes described and shown in the accompanying specification and drawings.

7. The combination of all the parts hereinbefore separately claimed into one apparatus for sweeping streets and roads, as set out fully in the accompanying specification and drawings.

WILLIAM WARREN.

Witnesses:
H. W. WILLIAMS,
*Gloucestershire Banking Co., Cheltenham.*
JAS. H. WINTERBOTHAM,
*Solicitor, Cheltenham.*